United States Patent [19]

Danek

[11] Patent Number: 4,870,531

[45] Date of Patent: Sep. 26, 1989

[54] CIRCUIT BREAKER WITH REMOVABLE DISPLAY AND KEYPAD

[75] Inventor: Robert J. Danek, Andover, Conn.

[73] Assignee: General Electric Company, New York, N.Y.

[21] Appl. No.: 232,035

[22] Filed: Aug. 15, 1988

[51] Int. Cl.[4] .............................................. H02H 3/04
[52] U.S. Cl. ....................................... 361/93; 361/91; 361/357; 340/711; 335/18
[58] Field of Search ........................ 361/91, 93, 96, 97, 361/391, 392, 331, 347, 350, 351, 353, 357, 360, 364, 393, 394; 307/140; 335/18, 189, 199; 340/870.29, 815.1, 815.13, 815.14, 706, 711, 717, 700, 870.02, 870.16; 455/346, 348, 347; 439/217

[56] References Cited

U.S. PATENT DOCUMENTS

| | | | |
|---|---|---|---|
| 4,143,417 | 3/1979 | Wald et al. | 340/711 X |
| 4,351,012 | 9/1982 | Elms et al. | 361/96 |
| 4,467,434 | 8/1984 | Hurley et al. | 340/870.02 X |
| 4,481,512 | 11/1984 | Tscheulin et al. | 340/825.25 |
| 4,507,526 | 3/1985 | Thomas | 361/357 X |
| 4,527,285 | 7/1985 | Kekas et al. | 361/394 X |
| 4,589,052 | 5/1986 | Dougherty | 361/94 |
| 4,628,397 | 12/1986 | Gareis et al. | 361/97 X |
| 4,672,501 | 6/1987 | Bilac et al. | 361/96 |
| 4,728,914 | 3/1988 | Morris et al. | 335/6 |
| 4,749,364 | 6/1988 | Arney et al. | 439/372 |
| 4,751,605 | 6/1988 | Mertz et al. | 361/91 |
| 4,780,786 | 10/1988 | Weynachter et al. | 361/97 X |
| 4,794,356 | 12/1988 | Yu et al. | 361/357 X |

OTHER PUBLICATIONS

Ser. No. 063,181 entitled "Test Kit For a Circuit Breaker Containing An Electronic Trip Unit", Burton et al., filed 6/17/87 (Docket 41PR-6583).

Primary Examiner—M. H. Paschall
Assistant Examiner—A. Jonathan Wysocki
Attorney, Agent, or Firm—Richard A. Menelly; Walter C. Bernkopf; Fred Jacob

[57] ABSTRACT

An electronic circuit interrupter digital display and keypad device includes a display to view circuit breaker settings and a keypad to select settings and values to be displayed. The display and keypad device removably connects to an electronic trip unit within the circuit interrupter by means of a plug-in connector.

13 Claims, 3 Drawing Sheets

CIRCUIT BREAKER WITH REMOVABLE DISPLAY AND KEYPAD

BACKGROUND OF THE INVENTION

This invention relates to solid state circuit interrupters employing digital electronic trip units. One such solid state circuit interrupter is described within U.S. Pat. No. 4,589,052, which Patent is incorporated herein for purposes of reference. Such electronic trip units are used in circuit interrupters and are capable of acting on a number of programmed parameters to interrupt the circuit being protected in a timely manner. One such electronic trip unit which allows for user interaction, provides capability both to select trip parameters and to view the selected trip parameters is found within U.S. Pat. No. 4,672,501, which Patent is also incorporated herein for purposes of reference.

For purposes of reducing cost while maintaining accuracy and functionality of the electronic trip units, microprocessors are being employed to gather information, process the information, and provide a means of monitoring the information using associated digital circuitry. The use of such microprocessors allows more protection functions to be contained in smaller-sized packages. Smaller-sized circuit interrupters do not contain the means required to enter data or to view the data being processed. Typically, required with molded case circuit interrupters, the size of the case limits the amount of area available for such user-interface equipment. The user-interfaces employed on molded case circuit interrupters typically consist of rotatable switches with associated printed indicia to indicate the relative switch positions. The amount of area available on the front panel of such circuit interrupters is limited and hence reduces the number of optional features requiring such switches.

A separate portable display and keypad in the form of a self-contained unit, powered by an internal power supply, which contains a microprocessor and associated circuitry and which communicates with the circuit interrupter trip unit using an infrared transmitter is described within U.S. Pat. No. 4,751,605. This arrangement requires a separate microprocessor and related digital circuitry within the portable display and keypad which adds to the overall cost of the circuit interrupter.

U.S. patent application Ser. No. 063,181 filed June 17, 1987 entitled "Test Kit for a Circuit Breaker Containing an Electronic Trip Unit" describes a separate portable display and keyboard unit that is capable of reading stored set points within an associated circuit interrupter but is incapable of changing the set point parameters.

It would be advantageous to provide a user-interface unit to a circuit interrupter which interfaces with the electronic trip unit to display and set the electronic trip unit parameters while keeping the size and cost of the user-interface unit within practical economic limits. Additionally, the user-interface unit should contain display capability for all possible circuit interrupter options while only displaying those parameters for which the electronic trip unit is configured by means of software located soley within the trip unit microprocessor.

Circuit interrupters currently employing independent set point adjustment locate a removable cover over the adjustment means for security reasons. The cover is usually sealed to the housing of the circuit interrupter by means of a crimped security wire looped through a hole in the circuit interrupter housing and a hole in the cover. To change the settings of the trip unit, the wire must be cut, the cover removed and then replaced when finished. This does not prevent unauthorized access, but merely provides an indication that such unauthorized access has taken place.

It would accordingly be advantageous to provide security to trip parameters stored within an electronic trip unit to prevent tampering or accidental modification of the trip unit settings without requiring a security wire.

Accordingly, one purpose of this invention is to provide a simple, inexpensive user-interface device which allows an operator to display and set the trip parameters of an electronic circuit interrupter while simultaneously preventing unauthorized access to the trip parameters.

SUMMARY OF THE INVENTION

A circuit interrupter containing an electronic trip unit interfaces with a removable digital display and keypad unit through an electrical connector on the exterior of the interrupter housing. The digital display and keypad unit provides a user-interface to display the trip unit parameters and to enter the trip unit settings. Since the trip unit settings are only accessible through this user-interface when it is connected to the circuit interrupter, unauthorized access to the trip unit settings is thereby avoided.

DESCRIPTION OF THE PREFERRED EMBODIMENT

Figure 1:
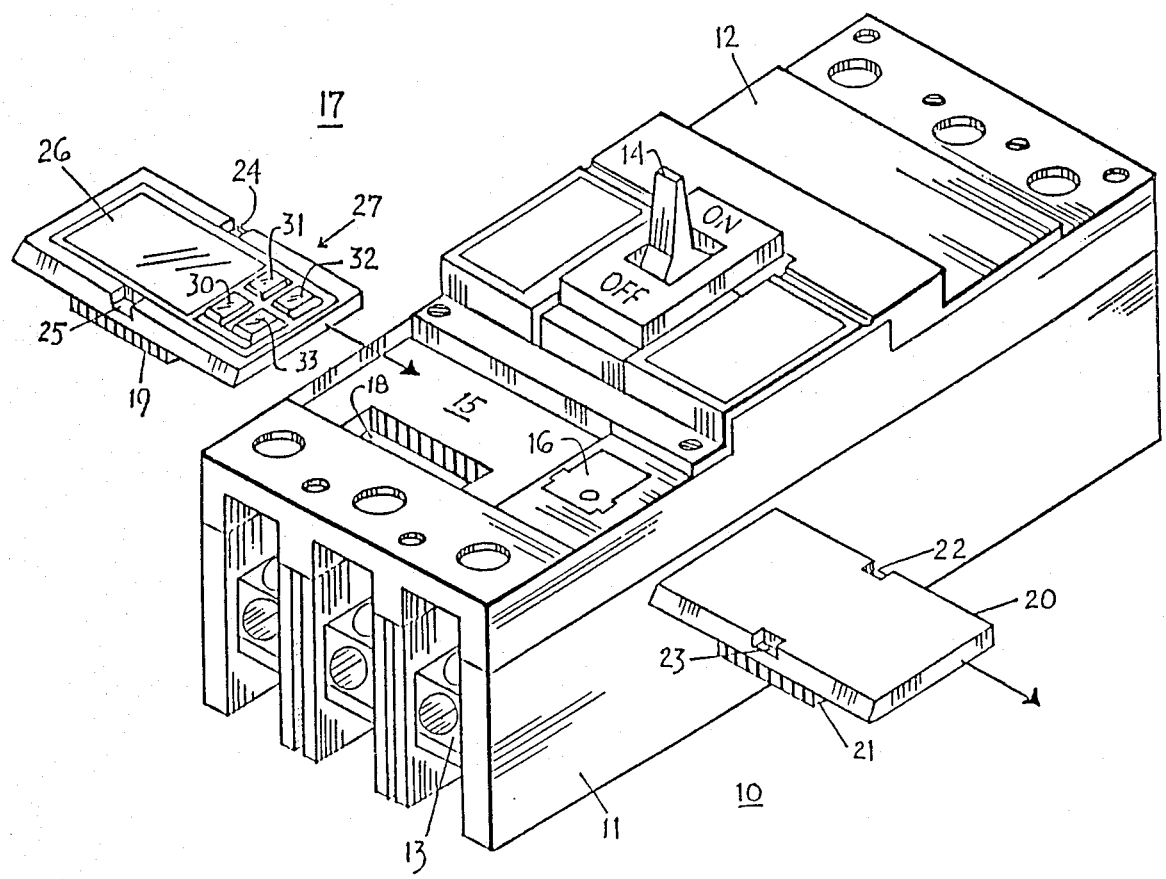
FIG. 1 is a top perspective view of a digital circuit interrupter with the display and keypad unit of the invention in isometric projection.
Figure 2A:
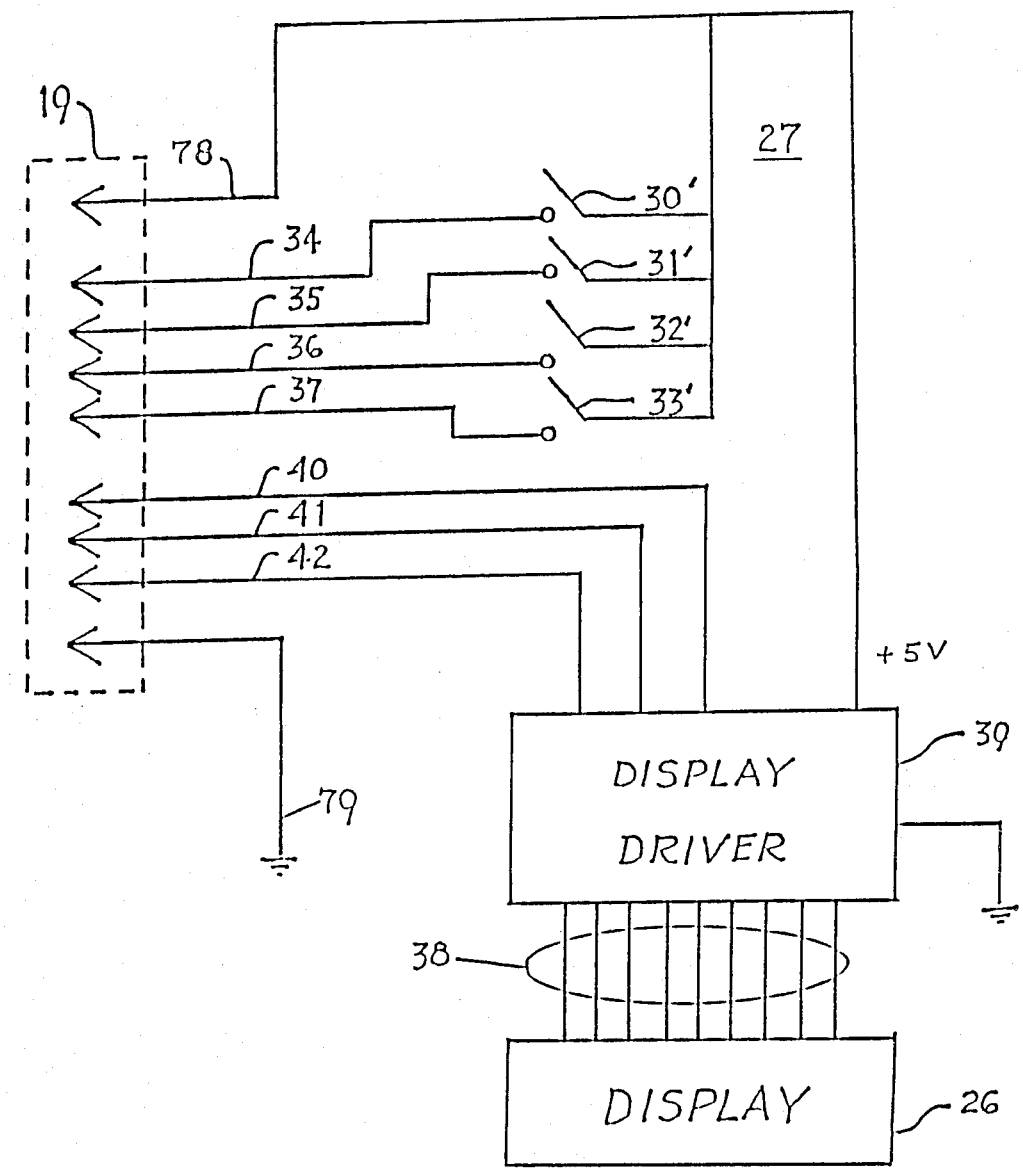
FIGS. 2A, 2B are diagrammatic representations of the digital circuit interrupter circuit and the display and keypad unit circuit.
Figure 2B:
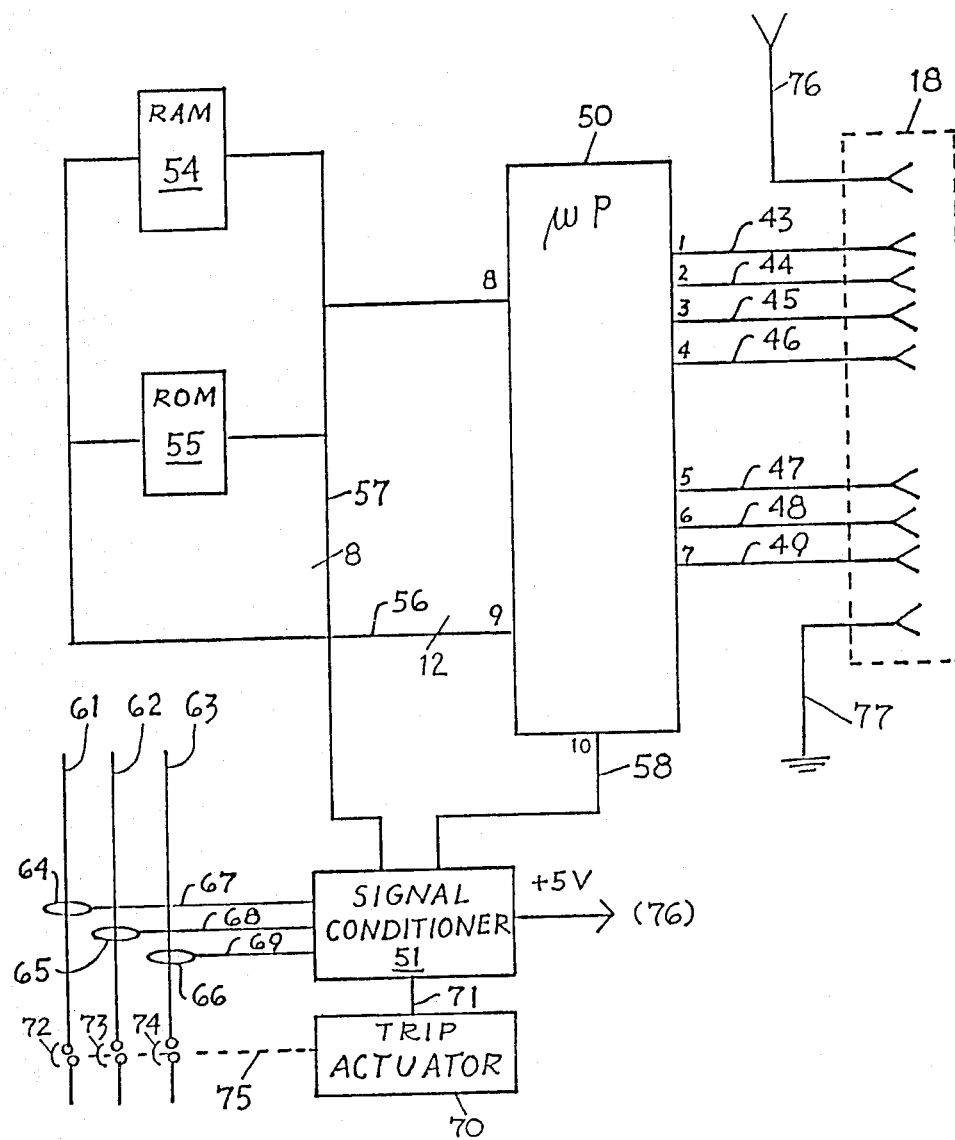

The keypad and display unit 27 of the invention is described herein with reference to FIGS. 1, 2A and 2B throughout.

A circuit breaker employing an electronic trip unit, hereafter "digital circuit interrupter" is depicted at 10. The digital circuit interrupter includes a case 11 closed by a cover 12 and electrical connection is made with the circuit interrupter by means of the load terminals 13 at one end and through corresponding line terminals at an opposite end (not shown). An operating handle 14 provides manual intervention to open the circuit breaker contacts (72-74) which are otherwise automatically controlled by means of an electronic trip unit 29 which trip unit is contained within the cover. A recess 15 is formed within the cover to accept the removable display and keypad unit 17. A female connector 18 is disposed within the recess such that when the display and keypad unit is inserted within the recess, mechanical and electrical connection is made between the male connector 19 on the bottom surface of the display and keypad unit and the female connector 18. The electrical connectors are both 9-pin connectors similar to RS-232D type connectors obtained from AMP Company, for example. The mechanical and electrical connection is made with sufficient force to hold the display and key-pad unit captive, yet allowing the user to easily remove the unit if so desired. The electrical connection provides the exchange of signals between the electronic trip unit 29 and the display and keypad unit circuit 28. Once this connection is established, the digital circuitry within the electronic trip unit will recognize switch closures from the keypad 27 in the form of voltage levels. The electronic trip unit responds to these signals by sending data to the display and keypad circuit over lines (40–42) for display. Power for the display and keypad unit is also obtained through the female connector, providing +5 volts DC and ground. The display and keypad unit 17 includes 4 keys (30–33) within the keypad 27 and an alphanumeric display 26 on the remainder of the display and keypad unit front surface. The rating plug unit 16 is similar to that described within U.S. Pat. No. 4,728,914 and is positioned within the cover 12 by means of a special tool to prevent unauthorized removal as described within this Patent, which is incorporated herein for purposes of reference. A security cover 20 is positioned within the recess 15 at the time of manufacture by means of a dummy male connector 21. To insert the display and keypad unit, the security cover 20 is removed by inserting the special tool within the keypad slots 22, 23 formed on opposite sides therein. When the security cover is removed, the display and keypad unit is then inserted within the recess by means of the special tool which engages similar keypad slots 24, 25 formed on the opposing sides of the display and keypad unit.

The alphanumeric display 26 is a common electronically controlled liquid crystal display. The keypad keys (30–33) are manufactured using common membrane switch technology. The interaction between the electronic display and keypad unit circuit 28 carried with the display and keypad unit 17 and the electronic trip unit circuit 29 within the digital circuit interrupter 10 is described as follows.

The electronic display and keypad unit circuit 28 is non-functional aside from the electronic trip unit circuit 29. The display and keypad unit contains only those components necessary to receive display data from the electronic trip unit circuit in the form of a serial-clocked bit stream and to send data to the electronic trip unit from the closure of keys (30–33). The display and keypad unit stores the display data in a memory contained within the display driver circuit 39, creates the necessary AC drive signals for the alphanumeric display 26 and sends the display data from the internal memory to the display. As described earlier, the electronic display and keypad unit circuit 28 connects with the electronic trip unit circuit 29 by means of the male and female connectors 19, 18. The keypad 27 connects with the male connector 19 through switches 30'–33' and conductors 34–37. The display driver 39 connects with the male connector through conductors 40–42 and with the power conductor 78 for supplying power to the electronic components contained therein. The alphanumeric display 26 connects with the display driver over a plurality of display control lines as 38.

The electronic trip unit circuit 29 is similar to that described within aforementioned U.S. Pat. No. 4,672,501 and connects with the electronic display and keypad unit circuit 28 through the female connector 18. A microprocessor 50 within the electronic trip circuit 29 interconnects with the female connector by means of I/O ports 1–7 and conductors 43–49. ROM 55, RAM 54 and signal conditioner circuit 51 directly connect with the 8-bit data bus 57 which connects with the microprocessor 50 at I/O port 8. The 12-bit address bus 56 directly connects with RAM 54, ROM 55 and with the microprocessor 50 at I/O port 9. Control line 58 connects the signal conditioner and power supply circuit 51 with I/O port 10 of the microprocessor. Operating power to the electronic trip unit circuit 29 is provided by the signal conditioner and power supply circuit. The signal conditioner and power supply circuit connects with the current transformers 64–66 within the 3-phase conductors (61–63) by means of conductors 67–69.

As described within the aforementioned U.S. Pat. No. 4,672,501, circuit current through the phase conductors 61–63 is sensed within the current transformers 64–66 and is rectified and transformed to a representative voltage signal within the signal conditioner circuit. The microprocessor 50 compares the sensed voltage signal to set point values stored in RAM 54 in accordance with a set of operating programs stored in ROM 55.

Upon the occurrence of an overcurrent condition on any one of the conductors 61–63 a time delay is determined within the microprocessor. After completion of a prescribed time delay, a trip signal is outputted from the microprocessor to the signal conditioner circuit and from there to a trip actuator 70 over conductor 71. The trip actuator is in the nature of a flux shift trip operator which interacts to open the contacts 72, 73, 74 as indicated by the dashed connection 75.

The operation of the display and keypad unit 17 is seen as follows. The microprocessor 50 in the electronic trip unit periodically determines the data segments which should be active for viewing based on the closures of the switches 30'–33' which are associated with keys 30–33 on the display keypad unit, and from data stored in ROM 55 and RAM 54. The display segment data is sent to the display and keypad unit 17 from the microprocessor over line 47 in the form of a serial bit stream, each bit corresponding to an associated segment on the display 26. This serial bit stream is inputted to the display driver 39 over lines (40–42) as described earlier.

The contents of the display memory is sent to the display 26 upon command from the microprocessor 50 in the electronic trip unit circuit 29. Each bit within the memory corresponds to 1 segment of the display. A logic "1" indicating that the associated segment is visible, or ON, and a logic "0" indicating that the associated segment is not visible, or OFF. The serial bit stream receiver, data memory, and display driver circuits are all contained within a commercially available display driver, such as a type MSM5265GS, obtained from the OKI Semiconductor Company.

The keys 30–33 of the keypad 27 are connected in a normally open circuit arrangement as indicated by the asociated switches 30'–33'. One side of each switch is connected to the power conductor 78. The other side of each corresponding switch is connected to the microprocessor over conductors (34–37) and (43–46). When any one of the switches is closed, 5V is presented at the associated I/O port of the microprocessor. The microprocessor 50 senses this voltage as a "high" input at the corresponding I/O port, indicating that the particular switch has been closed.

Operating power to the display and keypad circuit 28 is provided by the signal conditioning and power supply circuit 51 over conductor 76 in the electronic trip unit circuit 29 and power conductor 78 in the keypad and display circuit 28. Ground connection between the circuits is made by means of conductors 77 and 79.

To operate the display and keypad unit, the operator must press a key 30–33 on the keypad 27, causing the microprocessor 50 in the electronic trip unit circuit to sense this closure and realize that the display and circuit keypad unit is properly connected. The microprocessor begins sending data to the display 24 for viewing, and allows the operator to change the trip parameters stored in RAM 54. Once the operator has completed the desired communication with the electronic trip unit, the display and keypad unit 17 is then removed by means of the special tool. As soon as the microprocessor recognizes that a key has not been operated after a predetermined period of time, it determines that the display and keypad unit is no longer connected and stops sending data for display thereby disabling the capability to change the stored trip parameters. Further security to prevent unauthorized operation is provided by a sequence of key closures in a predetermined order before the microprocessor will display information and accept data for changing the stored trip parameters.

Having thus described my invention, what I claim as new and desire to secure by Letters Patent is:

1. An electronic circuit breaker removable keypad and display unit comprising:
    a planar insulative enclosure having top and bottom opposing surfaces;
    an alphanumeric display and a plurality of keys on said top surface electrically interacting with an electric circuit arranged intermediate said top and bottom surfaces; and
    a projection extending from said bottom surface whereby a first electrical connector on said projection interconnects with a second electrical connector arranged on an associated electronic circuit breaker.

2. The electronic circuit breaker removable keypad and display unit of claim 1 wherein said first electrical connector is a male connector and said second electrical connector is a female connector.

3. The electronic circuit breaker removable keypad and display unit of claim 1 including a pair of access slots on opposing sides of said top surface providing access to a tool removing said insulative enclosure from said electronic circuit breaker.

4. An electronic circuit breaker including means displaying stored set point parameters comprising in combination:
    a molded plastic case and a cover;
    circuit interrupting contacts arranged within said case automatically interrupting circuit current upon the occurrence of an overcurrent condition through said contacts;
    an electronic trip unit within said cover determining the occurrence of said overcurrent condition and comparing said overcurrent current condition to predetermined trip parameters stored within said electronic trip unit; and
    a keypad and display unit including a plurality of keys and a display arranged within said cover and electrically connected with said electronic trip unit, said plurality of keys providing operator access to said stored trip parameters for displaying said stored trip parameters on said display.

5. The electronic circuit breaker of claim 4 including a first electrical connector extending from a bottom surface of said keypad and display unit and a corresponding second electrical connector arranged within said cover, said second electrical connector receiving said first connector in press-fit relation.

6. The electronic circuit breaker of claim 5 wherein said keypad and display unit is removably retained within a first recess in said cover.

7. The electronic circuit breaker of claim 6 including a second recess within said first recess, said second electrical connector being supported within said second recess.

8. The electronic circuit breaker of claim 7 wherein said first electrical connector is a male connector and said second electrical connector is a female connector.

9. The electronic circuit breaker of claim 5 including a second insulative enclosure having a third electrical connector extending from a bottom surface thereof, said second electrical connector receiving said third electrical connector when said first electrical connector is not electrically connected with said second electrical connector.

10. The electronic circuit breaker of claim 4 wherein said electronic trip unit includes a microprocessor.

11. The electronic circuit breaker of claim 9 wherein said keypad and display unit includes a display driver circuit electrically connected with said display.

12. The electronic circuit breaker of claim 10 wherein said keypad further includes a plurality of switches responsive to said plurality of keys.

13. The electronic circuit breaker of claim 10 wherein said switches connect with said microprocessor through said first and second electrical connectors.

* * * * *